US008626596B2

(12) United States Patent
Hu et al.

(10) Patent No.: US 8,626,596 B2
(45) Date of Patent: Jan. 7, 2014

(54) ONLINE TRANSACTION METHOD AND SYSTEM USING A PAYMENT PLATFORM AND A LOGISTICS COMPANY

(75) Inventors: Xiaoming Hu, Hangzhou (CN); Jun Li Du, Hangzhou (CN); Xingjun Ni, Hangzhou (CN); Xiaoning Qi, Hangzhou (CN); Feng Yu, Hangzhou (CN); Liang Zhang, Hangzhou (CN); Shi Yu Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 656 days.

(21) Appl. No.: 12/670,057

(22) PCT Filed: Aug. 20, 2009

(86) PCT No.: PCT/US2009/054466
§ 371 (c)(1),
(2), (4) Date: May 5, 2010

(87) PCT Pub. No.: WO2010/022237
PCT Pub. Date: Feb. 25, 2010

(65) Prior Publication Data
US 2010/0287068 A1    Nov. 11, 2010

(30) Foreign Application Priority Data

Aug. 20, 2008    (CN) .......................... 2008 1 0210077

(51) Int. Cl.
*G06Q 30/00*    (2012.01)
(52) U.S. Cl.
USPC ...................................................... 705/26.1
(58) Field of Classification Search
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS 5,826,241 A * 10/1998 Stein et al. ................. 705/26.41
5,903,652 A    5/1999 Mital
(Continued)

FOREIGN PATENT DOCUMENTS

EP      1302880       4/2003
JP    2001-142954    *  5/2001    .............. G06F 17/60
(Continued)

OTHER PUBLICATIONS

Margaret L. Sheng "The Impact of Internet-Based Technologies on the Procurement Strategy", The Second International Conference on Electronic Business, Taipei, Taiwan, Dec. 10-13, 2002.*

(Continued)

*Primary Examiner* — Naeem Haq
(74) *Attorney, Agent, or Firm* — Lee & Hayes, PLLC

(57) ABSTRACT

The disclosed online transaction method and system uses payment platform acting as an intermediary agent between the merchant and the shipping company to handle the payment. While the payment platform receives payment from the shipping company, the merchant receives payment from the payment platform. The method and system do not require buyers to use the payment method provided by an intermediary transaction platform to make a payment. Instead, the buyer may pay directly to the shipping company. Unlike conventional transaction method based on COD, however, the disclosed online transaction method and system centrally manage a logistics platform or multiple logistics operations run by logistics companies. The merchant does not receive the payment from the logistics company, but rather receive the payment from a centralized payment platform to ensure secure and fast payment.

17 Claims, 5 Drawing Sheets

(56) References Cited

U.S. PATENT DOCUMENTS

| | | | |
|---|---|---|---|
| 5,910,896 A * | 6/1999 | Hahn-Carlson | 700/231 |
| 7,412,409 B2 | 8/2008 | Aliabadi et al. | |
| 7,624,057 B1 * | 11/2009 | Lunquist | 705/35 |
| 7,653,603 B1 * | 1/2010 | Holtkamp et al. | 705/72 |
| 7,756,765 B2 * | 7/2010 | Dippold et al. | 705/35 |
| 7,870,025 B2 * | 1/2011 | English | 705/14.49 |
| 8,321,247 B2 * | 11/2012 | Trumbly et al. | 705/7.11 |
| 8,370,269 B2 * | 2/2013 | MacDonald-Korth et al. | 705/319 |
| 2001/0018672 A1 | 8/2001 | Petters et al. | |
| 2001/0021925 A1 | 9/2001 | Ukigawa et al. | |
| 2001/0037290 A1 | 11/2001 | Lai | |
| 2001/0056395 A1 * | 12/2001 | Khan | 705/37 |
| 2002/0087469 A1 | 7/2002 | Ganesan et al. | |
| 2002/0111907 A1 | 8/2002 | Ling | |
| 2002/0111915 A1 | 8/2002 | Clemens et al. | |
| 2002/0152162 A1 * | 10/2002 | Eda et al. | 705/39 |
| 2003/0222760 A1 * | 12/2003 | Hara | 340/5.73 |
| 2004/0260615 A1 | 12/2004 | Phillips et al. | |
| 2005/0044040 A1 | 2/2005 | Howard | |
| 2005/0071244 A1 | 3/2005 | Phillips et al. | |
| 2005/0127175 A1 | 6/2005 | Mampaey | |
| 2005/0228537 A1 | 10/2005 | Unkelbach et al. | |
| 2005/0261984 A1 | 11/2005 | Hutchison et al. | |
| 2005/0289039 A1 | 12/2005 | Greak | |
| 2006/0036538 A1 * | 2/2006 | Griffis et al. | 705/39 |
| 2006/0089886 A1 | 4/2006 | Wong | |
| 2006/0247982 A1 | 11/2006 | Stolfo et al. | |
| 2007/0033070 A1 | 2/2007 | Beck et al. | |
| 2007/0100711 A1 | 5/2007 | Stroh | |
| 2007/0179841 A1 | 8/2007 | Agassi et al. | |
| 2007/0179861 A1 | 8/2007 | Woodfin | |
| 2008/0082378 A1 | 4/2008 | Duncan et al. | |
| 2008/0183590 A1 | 7/2008 | Drudis et al. | |

FOREIGN PATENT DOCUMENTS

| | | |
|---|---|---|
| WO | WO0133522 | 5/2001 |
| WO | WO2004093022 | 10/2004 |
| WO | WO2008095157 | 8/2008 |

OTHER PUBLICATIONS

The Extended European Search Report mailed Jul. 2, 2012 for European patent application No. 09808820.6, 9 pages.

* cited by examiner

ONLINE TRANSACTION METHOD AND SYSTEM USING A PAYMENT PLATFORM AND A LOGISTICS COMPANY

RELATED APPLICATIONS

This application is a national stage application of international patent application PCT/US09/54466, filed Aug. 20, 2009, entitled "ONLINE TRANSACTION METHOD AND SYSTEM USING A PAYMENT PLATFORM AND A LOGISTICS COMPANY", which claims priority from Chinese patent application, Application No. 200810210077.6, filed Aug. 20, 2008, entitled "ONLINE TRANSACTION METHOD AND SYSTEM", which applications are hereby incorporated in their entirety by reference.

TECHNICAL FIELD

The present disclosure relates to the field of networking, and particularly relates to methods and systems for conducting online transactions.

BACKGROUND

Along with the development of the Internet and maturity of encryption technologies such as digital signature, electronic commerce has been expanding globally at a tremendous pace. Many successful companies have grown up using electronic commerce as the primary method of business operation. The new business methods developed in context of e-commerce have completely revolutionized the existing business mode.

FIG. 1 shows a schematic structural diagram of a generic example of an existing online transaction system 100. The system 100 includes merchant 11, intermediary transaction platform 12, payment platform 13, and user 14. User 14 purchases a product of merchant 11, and makes an online payment using payment platform 13. Merchant 11 ships the product to user 14. Merchant 11 and payment platform 13 conduct account reconciliation and account remittance on a regular basis. Functions that are achieved by payment platform 13 may be integrated into intermediary transaction platform 12.

AliPay is an example of payment platform 13. User 14 may open an account with AliPay, and deposit a certain amount of fund into the account through direct deposit or recharging method. If user 14 purchases a product of merchant 11, a deduction from the account is processed through AliPay. This method only requires merchant 11 to complete account reconciliation and account remittance with AliPay on a regular basis.

Intermediary transaction platform 12 may have a server center 121 and a database 122. The server center 121 is used for processing transaction requests, while the database 122 is used for recording each transaction in real time.

As illustrated from the above online transaction, because merchant 11 and user 14 conduct trading through intermediary transaction platform 12, the security of the transaction is improved. From user 14's perspective, making a payment through intermediary transaction platform 12 removes concerns of the authenticity of the online virtual merchant 11 and the uncertainty about quality of a product to be purchased. From merchant 11's perspective, the sales volume is improved because intermediary transaction platform 12 establishes the confidence of buyers (user 14). This type of business mode achieves a win-win mode among merchant 11, user 14 and intermediary transaction platform 12, and has seen rapid development.

This type of business mode has deficiencies. First, the current business model does not satisfy the shopping needs of buyers who are not able to use the payment method provided by a payment platform, and also fails to satisfy users who feel insecure to commit a large amount of money to make an online purchase. Second, often a dispute arises because of inconsistency between what is actually purchased and what a user has seen in an image online when purchasing a product. Third, in online shopping, some merchants still sell products using direct home delivery and payment collection at the door through a logistics company. If a logistics company is entrusted to collect payments, merchant may face cash flow pressure if the logistics company is slow to return the payments. Fourth, if a logistics company is entrusted to collect payments, various transaction issues may arise because different merchants may entrust different logistics companies, and no uniform standard exists among logistics companies. This is especially true if payment by a logistics company is delayed.

SUMMARY OF THE DISCLOSURE

The disclosed online transaction method and system uses payment platform acting as an intermediary agent between the merchant and the shipping company to handle the payment. While the payment platform receives payment from the shipping company, the merchant receives payment from the payment platform. The method and system do not require buyers to use the payment method provided by an intermediary transaction platform to make a payment. Instead, the buyer may pay directly to the shipping company. Unlike conventional transaction method based on COD, however, the disclosed online transaction method and system centrally manage a logistics platform or multiple logistics operations run by logistics companies. The merchant does not receive the payment from the logistics company, but rather receive the payment from a centralized payment platform to ensure secure and fast payment.

The payment platform and the intermediary transaction platform may either be two separate platforms or integrated into a single intermediary platform.

The fund settlement between the payment platform and the logistics company may be conducted through a logistics platform on behalf of the logistics company. The logistics platform may either be a centralized logistics platform shared by multiple logistics companies, or separate logistics operations run by different logistics companies. In one embodiment, the method allows the merchant to select the logistics company from a plurality of logistics companies contracted with the intermediary transaction platform. The logistics company may be selected by the merchant as a default logistics company for all transactions involving the merchant. Alternatively, the logistics company may be designated by the intermediary transaction platform.

The fund settlement between the payment platform and the logistics company may include paying a service fee to the logistics company. The fund settlement between the payment platform and the merchant may include charging a service fee on the merchant. Both these fund settlements may be either separately conducted for each transaction or collectively conducted for multiple transactions on a periodic basis.

The online transaction system for conducting a merchandise transaction between a merchant and a user includes an intermediary transaction platform and a payment platform. The intermediary transaction platform and the payment platform are programmed to perform the acts of the method disclosed herein. The intermediary transaction platform is accessible by the user, the merchant, and the logistics company through the Internet. The payment platform is accessible by the merchant and the logistics company through a designated line or the Internet. The intermediary transaction platform and the payment platform may be connected through any one or more of a designated line, a local area network, and the Internet. In one embodiment, the intermediary transaction platform and the payment platform are integrated into a single intermediary platform.

Compared with existing technologies, the disclosed method and system have several potential benefits. First, using a payment platform acting between the merchant and the logistics company, payment delay that may be caused by the logistics company is avoided, and the security of a transaction is improved. With the existing COD method, the merchant suffers financial pressure due to slow return of payments by the logistics company which is entrusted to collect the payments on behalf of the merchant. With the disclosed method, the payment return by be logistics companies are centrally handled by the payment platform. This shifts the burden of payment collection from the logistics companies to the payment platform to be handled more efficiently. At the same time, the logistics company may receive service fees from the payment platform in a more uniform and reliable manner. Second, the buyer and the merchant can inquire conditions of the present transaction through a network in real time worth the benefit of convenience, swiftness and information transparency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The online transaction method and system are described in details using the companying figures.

In the presence disclosure, a "module" or a "unit" in general refers to a functionality designed to perform a particular task or function. A module or a unit can be a piece of hardware, software, a plan or scheme, or a combination thereof, for effectuating a purpose associated with the particular task or function. In addition, delineation of separate units does not necessarily suggest that physically separate devices are used. Instead, the delineation may be only functional, not structural, and the functions of several units may be performed by a single combined device or component. When used in a computer-based system, regular computer components such as a processor, a storage and memory may be programmed to function as one or more units or devices to perform the various respective functions.

Figure 1:
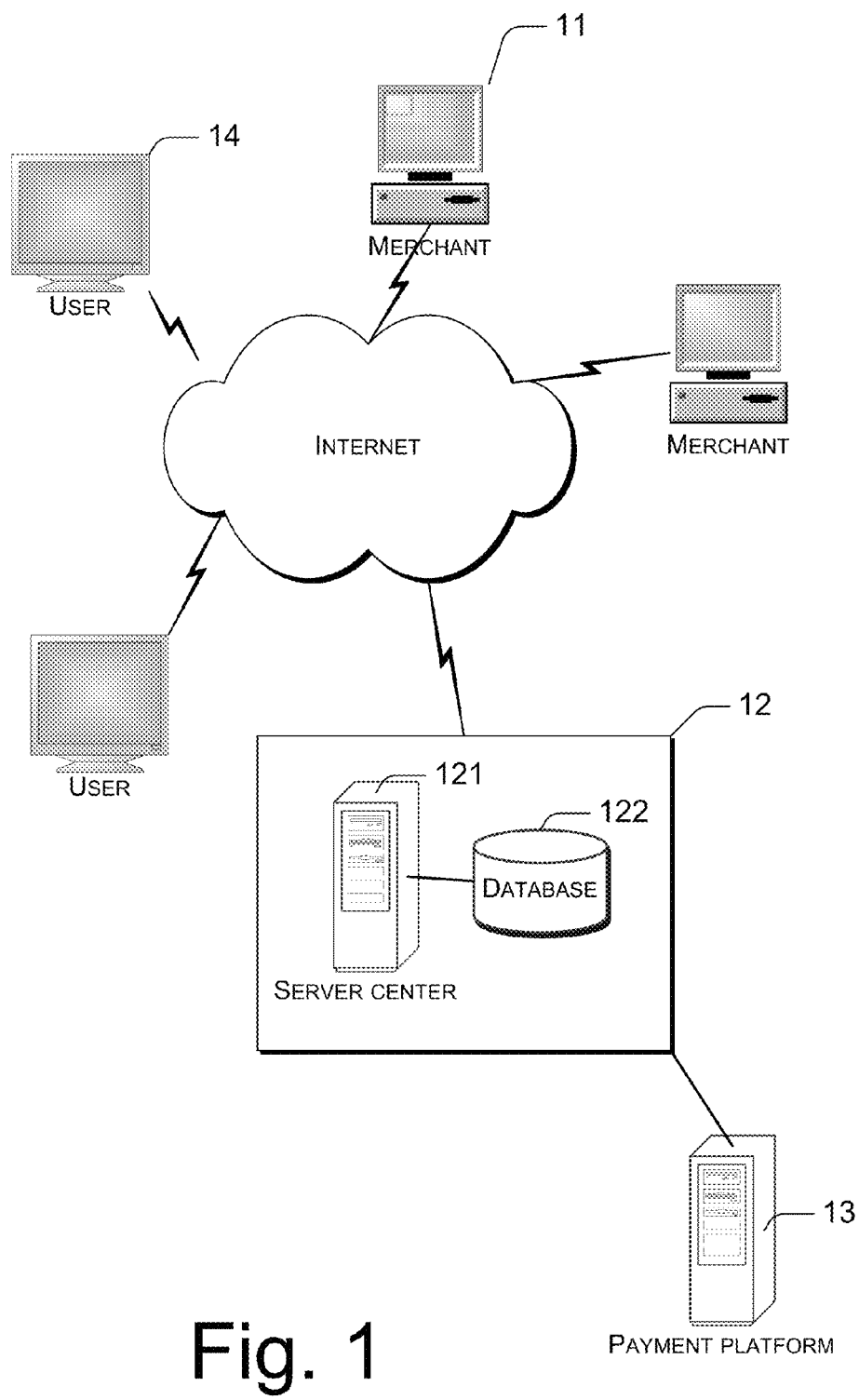
FIG. 1 shows a schematic structural diagram of an existing generic online transaction system.
Figure 2:
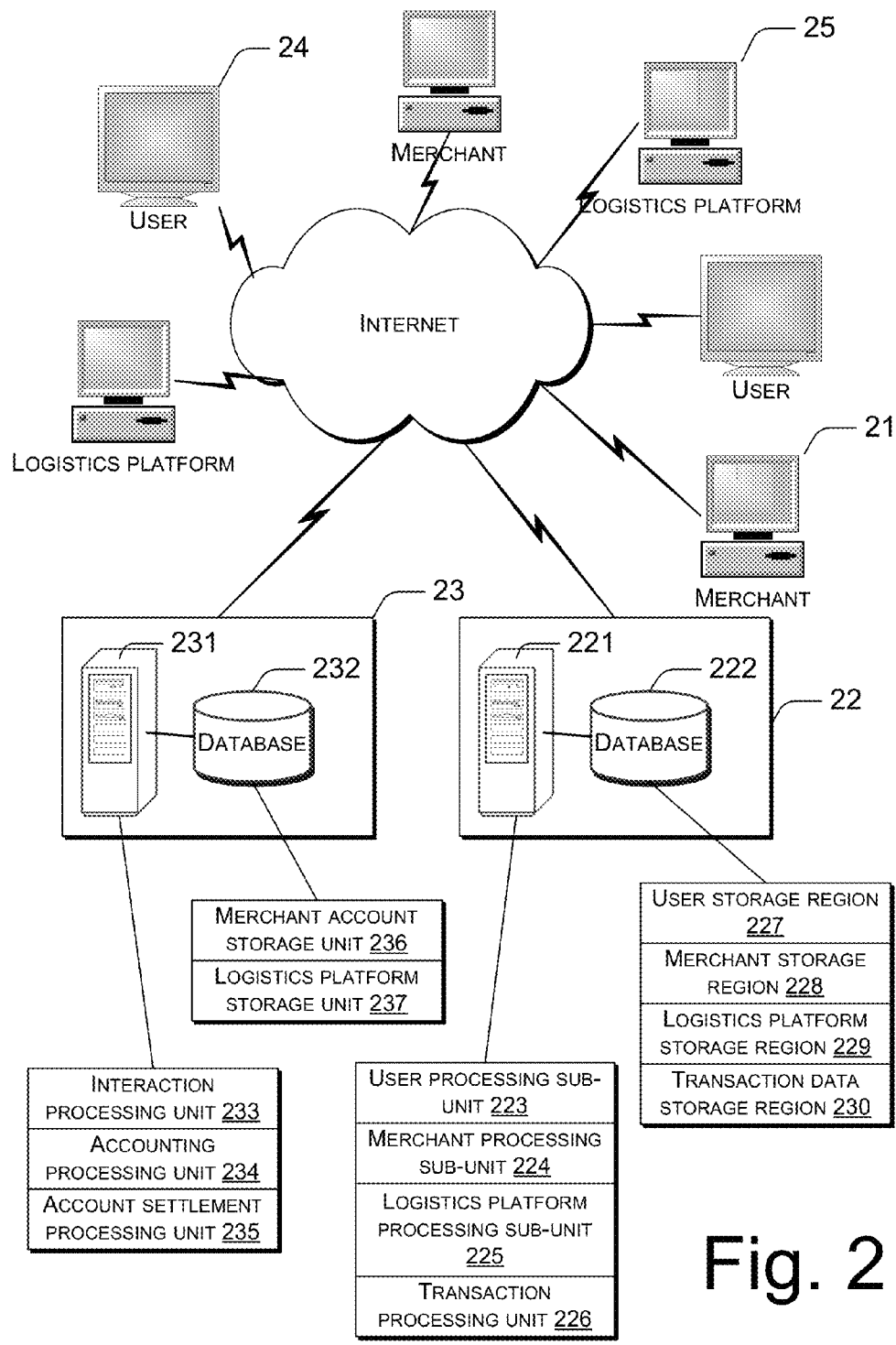
FIG. 2 shows a structural diagram of a first exemplary online transaction system in accordance with the present disclosure.

FIG. 2 shows an exemplary structural diagram of an online transaction system 200 in accordance with the present disclosure. The system 200 together with its application environment includes user 24 (e.g., a buyer), merchant 21, intermediary transaction platform 22, payment platform 23, and logistics platform 25 of a contracted logistics company. User 24, merchant 21, and logistics platform 25 connect with intermediary transaction platform 22 through the Internet. Merchant 21 and logistics platform 25 of the logistics company connect with payment platform 23 through the Internet. Alternatively, merchant 21 and logistics platform 25 may connect with payment platform 23 through designated lines. Intermediary transaction platform 22 and payment platform 23 are connected to each other through a designated line, or a local area network, or the Internet.

The core of the online transaction system for conducting a merchandise transaction includes intermediary transaction platform 22 and payment platform 23, which are programmed to perform the acts of the method disclosed herein.

In the present disclosure, intermediary transaction platform 22 is primarily established for conducting a transaction between merchant 21 and user 24. Intermediary transaction platform 22 stores contract information of each merchant, registration information of user 24, and contract information of each logistics company. Intermediary transaction platform 22 is used for processing and storing transaction data of each transaction. Payment platform 23 is primarily used for completing financial tasks of accounting and account settlement with merchant 21 and the logistics company.

Logical differentiation between intermediary transaction platform 22 and payment platform 23 is described in detail below.

Intermediary transaction platform 22 includes a first server 221 and a first database 222. Intermediary transaction platform 22 further includes a network interfacing device connecting with the Internet, and a network security device used for improving its security (a firewall, for example). These devices are general and common devices for an online transaction platform, and therefore are not described here.

The first server 221 is programmed to perform various functions. These functions are described below in terms of functional modules or units.

A user processing sub-unit 223 is used for receiving and processing various requests submitted by user 24. The requests may include registration, transaction request. The user processing sub-unit 222 is also used for establishing and saving interactive actions of user 24. It is appreciated that user 24 is a generic representation of any user. In practice, multiple users may be accessing the first server 221.

Upon registration on intermediary transaction platform 22, user 24 is allowed to conduct online transaction. While registering with a username and a password, user 24 may further specify a payment method upon delivery. With such registration information, intermediary transaction platform 22 knows the customary payment method used by user 24.

A merchant processing sub-unit 224 is used for receiving and processing various interactive actions with merchant 21. For example, the merchant processing sub-unit 224 is used for receiving and processing a registration request from merchant 21. If registration of merchant 21 satisfies registration requirements required by the present platform, registration is granted, and information of merchant 21 is saved. In each merchandise transaction, a transaction result is returned to merchant 21 through the merchant processing sub-unit 224. In one embodiment, merchant 21 may also log into intermediary transaction platform 22 through the merchant processing sub-unit 224 to inquire current transaction status of each transaction.

A logistics platform processing sub-unit 225 is used for receiving and storing contract information of the logistics company, and for receiving and processing various transaction information sent from logistics platform 25 in each transaction. For example, the logistics platform processing sub-unit 225 may send a result of pickup service and a user confirmation to payment platform 23 upon receiving such information.

A transaction processing unit 226 is used for processing each transaction, and saving a processing result to the first database 222.

The first database 222 may be divided into several regions for various storage functions. For example, a user storage region 227 is used for storing user information. A merchant storage region 228 is used for storing merchant information. A logistics platform storage region 229 is used for storing logistics company information. A transaction data storage region 230 is used for storing conditions of each transaction.

Payment platform 23 is used for conducting fund settlement with each merchant and each logistics company. In one embodiment, payment platform 23 handles fund settlement with merchant and fund settlement with logistics company separately. Payment platform 23 may conduct a first payment settlement with a logistics company (through logistics platform 25), and a second payment settlement with merchant 21. The first payment settlement may include receiving funds from the logistics company into payment platform 23. The second payment settlement may include transferring funds from payment platform 23 to merchant 21.

Based on different connection methods between payment platform 23 and intermediary transaction platform 22, slightly different hardware combinations may be installed in payment platform 23. For example, a network security device (e.g., a firewall) may be installed in payment platform 23 if payment platform 23 and intermediary transaction platform 22 are connected through the Internet. If payment platform 23 and intermediary transaction platform 22 are connected through a designated line, a network security device may not be needed.

Payment platform 23 further includes a second server 231 and a second database 232. The second server 231 includes various functional units. For example, an interaction processing unit 233 is used for processing interactions with intermediary transaction platform 22. An accounting processing unit 234 is used for performing accounting operations with each logistics platform 25 on a regular basis or in real time according to a predetermined setting. If logistics platform 25 is set to complete accounting work in regular periods, all charges which include costs of products, shipping costs, and service charges within a present period are sent to payment platform 23 from the logistics company in advance. Payment platform 23 then distributes shared charges logistics companies based on an income-sharing scheme.

An account settlement processing unit 235 is used for completing account settlement operations with each merchant on a regular basis or in real time according to a predetermined setting. Each merchant may select a method for account settlement based on its characteristics and transactional characteristics of the product. For example, upon completion of each transaction, merchant 21 may select that payment platform 23 to send a payment including cost of the product and shipping charge in the present successful transaction to an account designated by merchant 21.

The second database 232 may include various units for different storage purposes. A merchant account storage unit 236 is used for storing rules of account settlement with merchant 21, and for storing conditions of account settlement of each transaction with merchant 21. A logistics platform storage unit 237 is used for storing rules of account settlement with logistics companies, and for storing conditions of account settlement of each transaction with the respective logistics company.

The user processing sub-unit 223, the merchant processing sub-unit 224, the logistics platform processing sub-unit 225, and the transaction processing unit 226 are logical units, and may be integrated in a processor of the first server 221. Likewise, they accounting processing unit 234 and the account settlement processing unit 235 are logical units, and may be integrated in a processor of the second server 231.

The fund settlement between payment platform 22 and the logistics company may be conducted through logistics platform 25 on behalf of the logistics company. Logistics platform 25 may either be a centralized logistics platform shared by multiple logistics companies, or separate logistics operations run by different logistics companies.

The fund settlement between payment platform 23 and the logistics company may include paying a service fee to the logistics company. The fund settlement between payment platform 23 and merchant 21 may include charging a service fee on merchant 21. Both these fund settlements may be either separately conducted for each transaction or collectively conducted for multiple transactions on a periodic basis.

Figure 3:
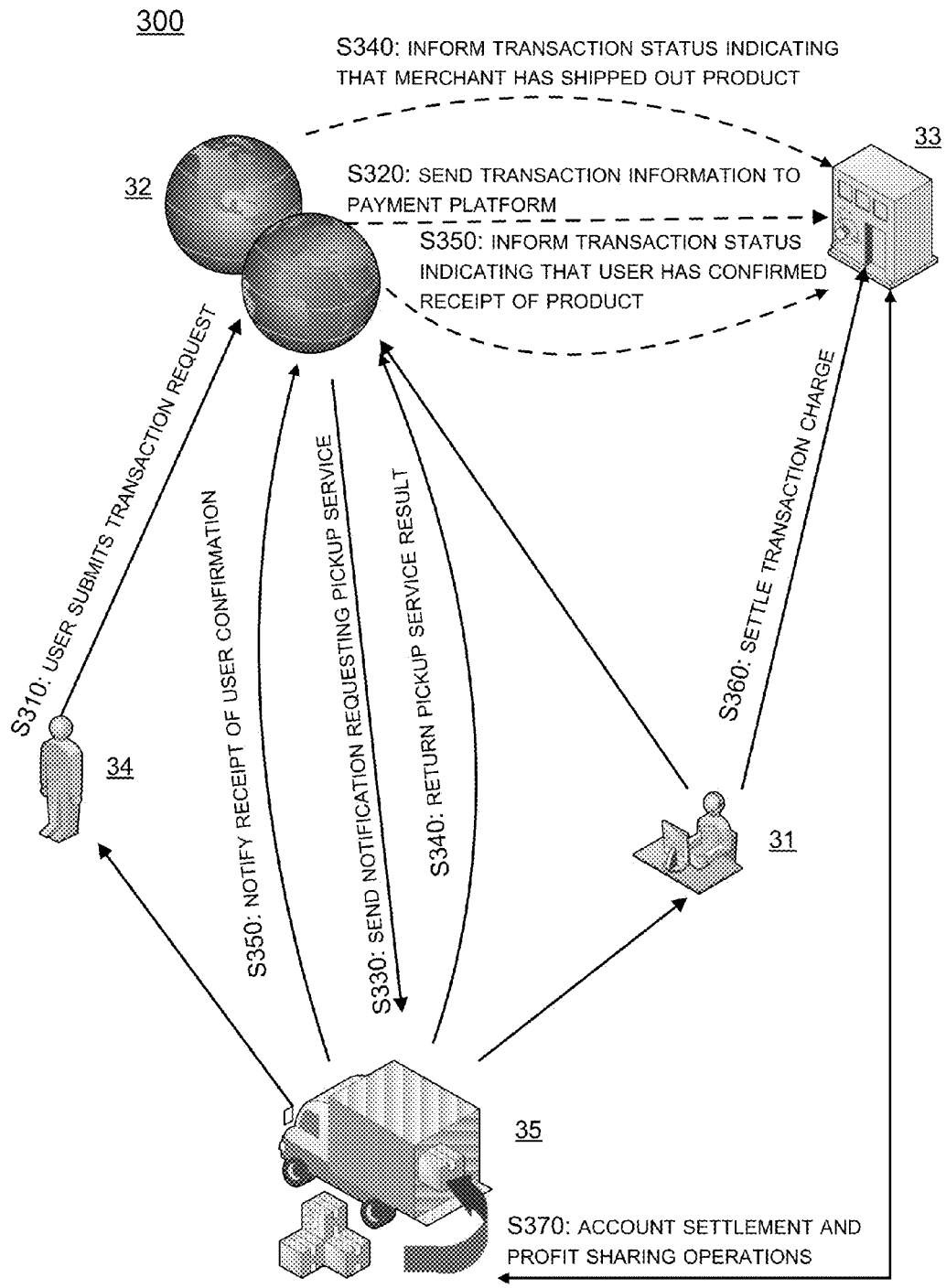
FIG. 3 shows a flow chart of a first exemplary online transaction method in accordance with the present disclosure.

FIG. 3 shows an exemplary method 300 of online transaction using the system of the present disclosure. The method 300 is used for conducting a merchandise transaction between merchant 31 and user 34 through logistics platform 35 of a logistics company. The method includes the procedures described as follows. In this description, the order in which a process is described is not intended to be construed as a limitation, and any number of the described process blocks may be combined in any order to implement the method, or an alternate method.

S310: User 34 purchases a product of merchant 31 through intermediary transaction platform 32, and submits to intermediary transaction platform 32 a transaction request including a payment mode such as cash-on-delivery selected by user 34.

Merchant 31 posts products to be sold (e.g., auctioned) with prices onto intermediary transaction platform 32. Upon logging onto intermediary transaction platform 32, registered user 34 can see a total cost (which includes product price, shipping charge and service charge) and a payment method required for purchasing a product. User 34 submits a transaction request to intermediary transaction platform 32 upon deciding to purchase the product. The transaction request includes product information, required payment amount and payment mode. If user 34 selects a payment method of cash-on-delivery (COD), the transaction request may further include a user address for delivery.

S320: Intermediary transaction platform 32 sends transaction information which includes the mode of payment to payment platform 33. Upon receiving the transaction request from the user 34, intermediary transaction platform 32 creates a record of the transaction, and sends the transaction information (especially the payment method) to payment platform 33 to facilitate the creation of the transaction by payment platform 33.

S330: Intermediary transaction platform 32 sends a request for pickup service to logistics platform 35 of a contracted logistics company which is either selected by merchant 31 or designated by intermediary transaction platform 32.

In one embodiment, step S330 may include the following procedure. Intermediary transaction platform 32 sends information of the transaction request to merchant 31. This allows merchant 31 to timely learn about the conditions of the present transaction, and helps merchant 31 quickly prepare the product for shipping. Merchant 31 submits to intermediary transaction platform 32 information of a contracted logistics company designated by merchant 31. Thereafter, intermediary transaction platform 32 sends to the logistics company a request for pickup service. The request may include the information of the product to be picked up, the total cost for purchasing the product, and the address of user 34. Logistics platform 35 may optionally log onto intermediary transaction platform 32 to find the address of merchant 31.

Alternatively, the step S330 may include the following procedures. Intermediary transaction platform 32 directly sends the request for pickup service to logistics platform 35 corresponding to a contracted logistics company which has been designated by merchant 31 in advance.

Logistics companies sign a contract in advance with intermediary transaction platform 32 to become contracted logistics companies. In each transaction, merchant 31 may select one contracted logistics company from the available contracted logistics companies to complete the present transaction.

Alternatively, merchant 31 may select in advance one contracted logistics company from these contracted logistics companies to be merchant 31's designated logistics company, and complete all transactions using the designated logistics company.

S340: Upon receiving a result of pickup service indicating that "goods has been successfully picked up" from logistics platform 35, intermediary transaction platform 32 sends to payment platform 33 a transaction status indicating that merchant 31 has shipped the product.

The outcome of a logistics company's attempt to pick up goods is usually either a "successful pick-up of goods" or an "unsuccessful pick-up of goods". If the outcome is a "successful pick-up of goods", the logistics company sends the result of pickup service to payment platform 33 through its logistics platform 35. Intermediary transaction platform 32 stores the result of pickup service to allow inquiring from merchant 31 and user 34, and sends a transaction status indicating "successful pick-up of goods" to payment platform 33.

If the outcome is "unsuccessful pick-up of goods", the logistics company also sends the result of pickup service to intermediary transaction platform 32 through its logistics platform. A cause for the "unsuccessful pick-up of goods" may be included in the result of pickup service. For example, merchant 31 may have failed to complete the transaction because it has not prepared the product.

Intermediary transaction platform 32 may track occasions wherein a result of pickup service indicating "unsuccessful pick-up of goods" is received from logistics platform, and apply a punitive measure on a merchant according to a pre-determined rule if an accumulative number of such failure occasions of the particular merchant is greater than a threshold. For example, upon receiving the result of pickup service indicating "unsuccessful pick-up of goods" from logistics platform 35, intermediary transaction platform 32 sends the result of pickup service to the payment platform 33, and determines whether the total number of "unsuccessful pick-up of goods" this particular merchant has accumulated is greater than a threshold. If yes, merchant 31 may be dealt with according to a pre-determined rule. For instance, intermediary transaction platform 32 may exclude merchant 31 from trading on intermediary transaction platform 32.

S350: Upon receiving a user confirmation indicating "user has confirmed the receipt of goods" from logistics platform 35, intermediary transaction platform 32 sends to payment platform 33 a transaction status indicating that the buyer (i.e., user 34) has confirmed receiving the product.

For example, after the logistics company delivers a product to user 34, the user 34 may usually make a payment upon verification of the receiving unit. The logistics company then sends information of a user confirmation to intermediary transaction platform 32 through its logistics platform 35. Intermediary transaction platform 32 in turn sends a corresponding transaction status to payment platform 33. However, sometimes the user may refuse to pay for the product. In this case, the logistics company needs to send information indicating the user rejection to intermediary transaction platform 32 through its logistics platform 35. Intermediary transaction platform 32 then not only sends a corresponding transaction status to payment platform 33, but also needs to perform the several additional operations. For example, intermediary transaction platform 32 may send to logistics platform 35 a processing instruction indicating a return of the product to merchant 31. Logistics platform 35 sends to intermediary transaction platform 32 a processing result indicating that the product has been returned to merchant 31. Intermediary transaction platform 32 then sends the processing result to payment platform 33.

S360: Payment platform 33 and merchant 31 settle a transaction payment in real time or on a regular basis.

In one exemplary embodiment, if merchant 31 wants to receive the payment faster, payment platform 33 may transfer the cost of the product and the shipping charge to merchant 31 quickly upon receiving "user confirmation of receipt of goods" in each transaction. However, payment platform 33 and merchant 31 may agree to settle payments on a periodic basis. Payment platform 33 may transfer all payments of successful transactions within the present period to merchant 31 in each settlement.

S370: Payment platform 33 and logistics platform 35 complete accounting and profit sharing (or revenue distribution) operations in real time or on a regular basis.

In a typical arrangement, the logistics company transfers each payment received from user 34 to payment platform 33. The payment by user 34 covers all charges of products, shipping charges, and service fees. Payment platform 33 subsequently pays a service fee to the logistics company as part of the profit sharing (or revenue distribution). If intermediary transaction platform 32 and payment platform 33 belong to different companies, service charges are shared among three parties. How payment platform 33 and logistics platform 35 conduct account settlement may depend on a rule of account settlement agreed upon by both parties in advance.

It is noted that logistics platform 35 may either be a centralized platform or simply individual logistics operations run by merchant companies. In either case, the centralized logistics platform 35 or separate logistics platforms (operations) 35 are centrally managed by payment platform 33. As illustrated from the above transaction process, logistics companies sign contracts with payment platform 33 in advance, and payment platform 33 conducts centralized management of the logistics companies. From a merchant's perspective, the problem of delayed payments can be solved. From a user's (buyer's) perspective, the transaction has a more secure safeguard.

As will be shown below, in one embodiment, the payment platform may be set up in the intermediary transaction platform.

Figure 4:
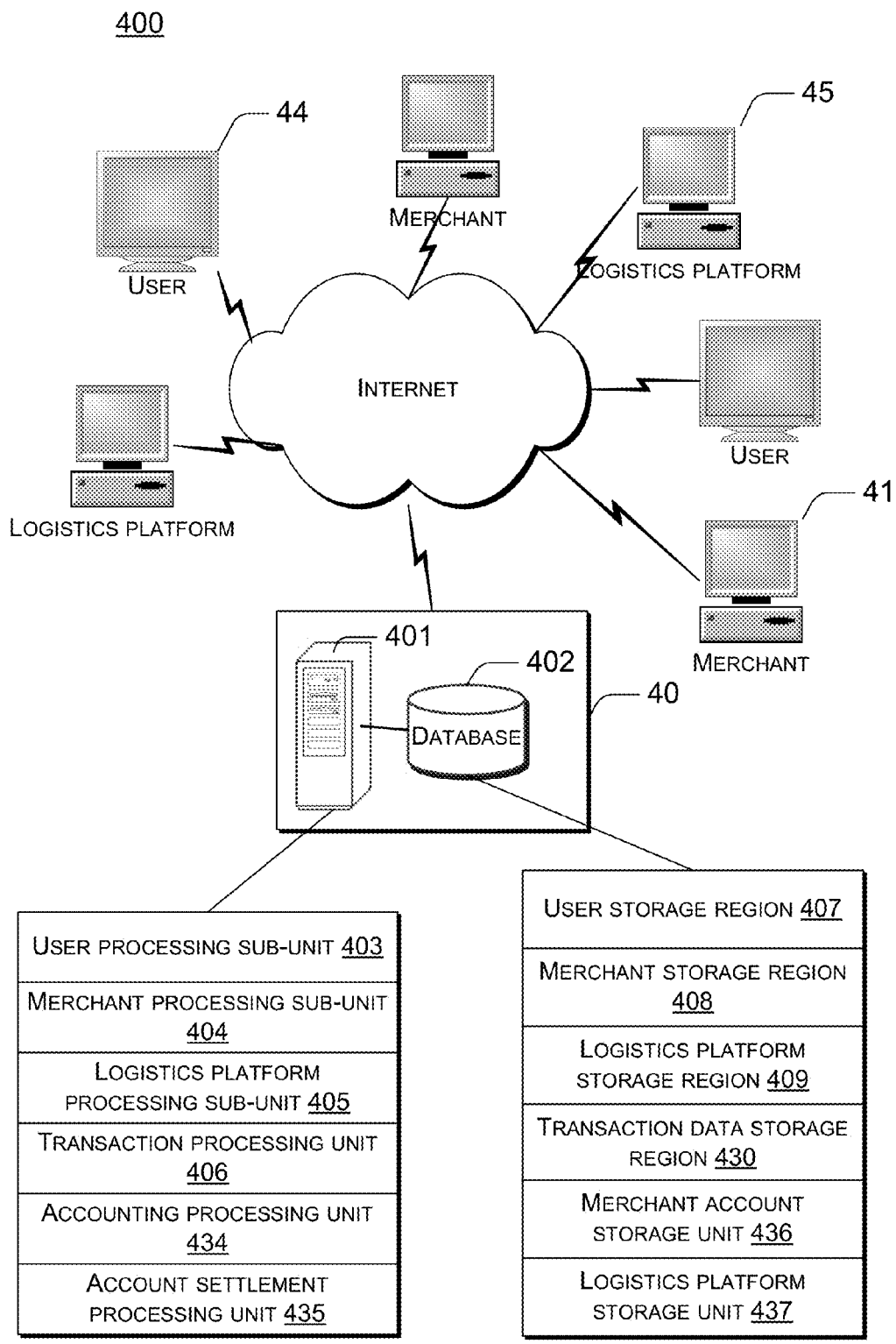
FIG. 4 shows a structural diagram of a second exemplary online transaction system in accordance with the present disclosure.

FIG. 4 shows a schematic structural diagram of a second exemplary online transaction system 400 in accordance with the present disclosure. The system 400 includes user 44, merchant 41, intermediary platform 40, and logistics platform 45 of a contracted logistics company. User 44, merchant 41, and logistics platform 45 of the logistics company connect with intermediary platform 40 through the Internet.

Intermediary platform 40 is a platform primarily established for conducting a transaction between merchant 41 and user 44. Intermediary platform 40 stores contract information of each merchant 41, registration information of user 44, and contract information of each logistics company. Intermediary platform 40 is used for processing and storing transaction conditions of each transaction.

Intermediary platform 40 is a combination of intermediary transaction platform 32 and payment platform 33, which are integrated into a single platform in this embodiment. Functions of intermediary transaction platform 32 and payment platform 33 are integrally performed by intermediary platform 40.

Intermediary platform 40 includes a first server 401 and a first database 402. Intermediary platform 40 further includes a network interfacing device connecting with the Internet, and a network security device used for improving its security (a firewall, for example). These devices are general and common devices for an online transaction platform, and therefore are not described.

The first server 401 includes several units to perform various functions. A user processing sub-unit 403 is used for receiving and processing various requests submitted by user 44. Such requests may include registration and transaction request of user 44. The user processing sub-unit 402 is also used for establishing and saving interactive actions of user 44. A merchant processing sub-unit 404 is used for receiving and processing various interactive actions with merchant 41. A logistics platform processing sub-unit 405 is used for receiving and saving contract information of the logistics company, and for receiving and processing various transaction information sent from logistics platform 45 in each transaction process. A transaction processing unit 406 is used for processing each transaction and saving a processing result to the first database 402. An accounting processing unit 434 is used for completing accounting operations with each logistics platform 45 on a regular basis or in real time according to a predetermined setting. An account settlement processing unit 435 is used for completing account settlement operations with each merchant 41 on a regular basis or in real time according to a predetermined setting.

Each merchant may select, based on characteristics thereof and transaction characteristics of product, a method for account settlement. For example, merchant 41 may elect that intermediary platform 40 send a payment including the cost of product and shipping charges an account designated by merchant 41 upon completion of each transaction in order to speed up the payment cycle.

The first database 402 is divided into several regions for different storage purposes. For example, a user storage region 407 is used for storing user information. A merchant storage region 408 is used for storing merchant information. A logistics platform storage region 409 is used for storing logistics company information. A transaction data storage region 430 is used for storing conditions of each transaction. A merchant account storage unit 436 is used for storing rules of account settlement with merchant 41, and for storing conditions of account settlement of each transaction with merchant 41. A logistics platform storage unit 437 is used for storing rules of account settlement with logistics companies, and for storing conditions of account settlement of transaction with logistics companies.

Figure 5:
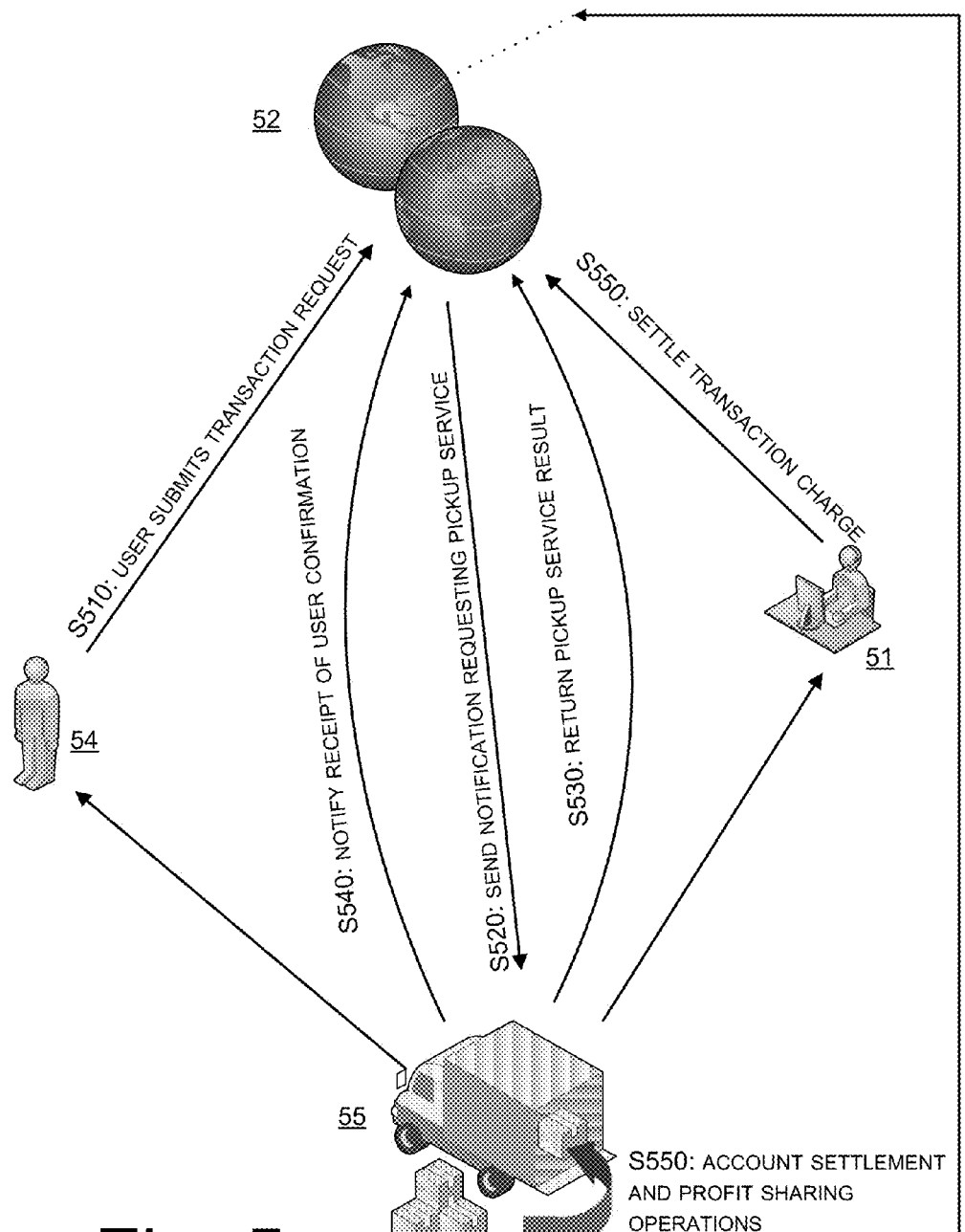
FIG. 5 shows a flow chart of a second exemplary online transaction method in accordance with the present disclosure.

FIG. 5 shows a flow chart of a second exemplary online transaction method 500 in accordance with the present disclosure. The method 500 can be implemented using the system 400 of FIG. 4. Like the method 300 of FIG. 3, the method in this embodiment is used for conducting a merchandise transaction between a merchant and a user through a logistics company. The method 500 is described as follows.

S510: User 54 purchases a product of merchant 51 through intermediary transaction platform 52, and submits to intermediary transaction platform 52 a transaction request including a mode of payment (e.g., COD) selected by the user.

S520: Intermediary transaction platform 52 sends a request for pickup service to logistics platform 55 of a contracted logistics company which is either selected by the merchant or designated by intermediary transaction platform 52.

S530: Logistics platform 55 sends a result of pickup service indicating "successful pick-up of goods" to intermediary transaction platform 52.

S540: Logistics platform 55 sends a user confirmation indicating "user has confirmed the receipt of goods" to intermediary transaction platform 52.

S550: Intermediary transaction platform 52 conducts operations of transaction settlement with merchant 51 and logistics platform 55 in real time or on a regular basis. The settlement with merchant 51 and the settlement with logistics platform 55 may be conducted separately.

If a result of pickup service indicating "unsuccessful pick-up of goods" is received from logistics platform 55, intermediary transaction platform 52 determines whether the number of "unsuccessful pick-up of goods" accumulated by this particular merchant is greater than a threshold. If yes, the merchant is dealt with according to a pre-determined rule.

If logistics platform 55 sends to intermediary transaction platform 52 a user confirmation indicating "user rejection of goods", intermediary transaction platform 52 sends to logistics platform 55 a processing instruction indicating a return of the product to merchant 51. Subsequently, logistics platform 55 sends to intermediary transaction platform 52 a processing result indicating that the product has been returned to merchant 51.

Step S550 may further include the following exemplary procedure. Intermediary transaction platform 52 advances to the merchant a payment including cost of the product and a shipping charge in advance. Logistics platform 55 regularly clears the account by transferring to intermediary transaction platform 52 payments including the cost of the product, the shipping charge, and a service charge received. Intermediary transaction platform 52 regularly distributes to logistics platform 55 a service fee based on a profit-sharing (or revenue distribution) agreement.

The disclosed online transaction method and system do not require buyers to use the payment method provided by an intermediary transaction platform to make a payment. Instead, the buyer may pay directly to a logistics company such as a shipping company. Unlike conventional transaction method based on COD, however, the disclosed online transaction method and system centrally manage the logistics platform or multiple logistics operations run by logistics companies. The merchant does not receive the payment from the logistics company, but rather receive the payment from a centralized payment platform, which is either a separate platform or a part of an intermediary transaction platform supporting online transactions. The payment platform acts as an intermediary agent to handle the payment. While the payment platform receives payment from the logistics company, the merchant receives payment from the payment platform.

The payment may be settled sequentially in that order for each individual transaction, but may also be handled collectively on a periodical basis to further increase the cash flow efficiency for the merchants. The method and the system also benefit the buyer because the buyer has an option to pay on delivery only and is not required to either directly pay the merchant in advance or pay an intermediary transaction platform in advance. This helps to avoid disputes that arise because of inconsistency between what is actually purchased and what a user has seen in an image online when purchasing a product.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An online transaction method for conducting a merchandise transaction between a merchant and a user, the method comprising:
   under control of one or more computing systems comprising memory and one or more processors,
      allowing the user to purchase a product of the merchant through an intermediary transaction platform;
      receiving from the user a transaction request including at least a mode of payment selected by the user;
      sending a request for pickup service to a logistics company;
      receiving a first transaction status indicating that the merchant has shipped the product;
      tracking occasions indicating unsuccessful pick-up of goods received from the logistics company;
      applying a punitive measure on the merchant according to a pre-determined rule if an accumulative number of the occasions is greater than a threshold;
      receiving a second transaction status indicating that the user has confirmed receiving the product;
      conducting a first fund settlement between a payment platform and the logistics company, the first fund settlement including receiving funds from the logistics company into the payment platform; and
      conducting a second fund settlement between the payment platform and the merchant, the second fund settlement including transferring funds from the payment platform to the merchant.

2. The online transaction method as recited in claim 1, wherein the payment platform is a separate platform from the intermediary transaction platform.

3. The online transaction method as recited in claim 1, wherein the payment platform and the intermediary transaction platform are integrated into a single intermediary platform.

4. The online transaction method as recited in claim 1, wherein the first fund settlement between the payment platform and the logistics company is conducted through a logistics platform on behalf of the logistics company.

5. The online transaction method as recited in claim 1, wherein the first fund settlement between the payment platform and the logistics company and the second fund settlement between the payment platform and the merchant are conducted collectively for multiple transactions on a periodic basis.

6. The online transaction method as recited in claim 1, wherein the first fund settlement comprises paying a service fee to the logistics company.

7. The online transaction method as recited in claim 1, wherein the second fund settlement comprises charging a service fee on the merchant.

8. The online transaction method as recited in claim 1, further comprising:
   allowing the merchant to select the logistics company from a plurality of logistics companies contracted with the intermediary transaction platform.

9. The online transaction method as recited in claim 8, wherein the logistics company is selected by the merchant as a default logistics company for all transactions involving the merchant.

10. The online transaction method as recited in claim 1, wherein the logistics company is designated by the intermediary transaction platform.

11. Non-transitory memory encoded with instructions that, when executed by a processor of a computing device, perform acts comprising:
   receiving a transaction request for an item from a device associated with a user, the transaction request including a mode of payment selected by the user;
   transmitting a delivery request to a device associated with a logistics company based on the transaction request;
   receiving a first transaction status indicating that the item is shipped;
   determining that the item is not successfully picked up;
   generating or updating a failure record for a merchant associated with the item;
   determining that a number of failure occasions indicated by the failure record is greater than a predetermined number;
   taking a punitive measure against the merchant based on a predetermine rule;
   receiving a second transaction status indicating that the user receives the item; and
   conducting a first fund settlement between a payment platform and the logistics company, the first fund settlement including receiving funds from the logistics company into the payment platform.

12. The non-transitory memory of claim 11, wherein the acts further comprise conducting a second fund settlement between the payment platform and the merchant that ships the item, the second fund settlement including transferring funds from the payment platform to the merchant.

13. The non-transitory memory of claim 11, wherein the receiving the second transaction status comprises:
   receiving a message from the logistical company;
   determining, based on the message, whether the user makes a payment for the item;
   in an event that the user makes the payment for the item, transmitting a transaction status information to the device associated with the payment platform; and
   in an event that the user does not make the payment for the item:
      transmitting a transaction status information to the device associated with the payment platform, and
      transmitting an instruction to a device associated with the logistics company to return the item to a merchant that ships the item.

14. The non-transitory memory of claim 13, wherein the determining that the user receives the item further comprises:
  in an event that the user does not make the payment for the item:
    receiving from the device associated with the logistical company a confirmation indicating that the item is returned to the merchant; and
    generating and transmitting information associated with the confirmation to the payment platform.

15. A system for online transactions, the system comprising:
  one or more processors; and
  memory to maintain a plurality of components executable by the one or more processors, the plurality of components comprising:
    a user processing unit configured to receive a transaction request for an item from a device associated with a user,
    a logistics processing unit configured to:
      transmit a delivery request to a device associated with a logistics company based on the transaction request,
      determine that the item is shipped, and
      determine that the user receives the item, and
    a transaction processing unit configured to:
      conduct a first fund settlement between a payment platform and the logistics company, the first fund settlement including receiving funds from the logistics company into the payment platform,
      conduct a second fund settlement between the payment platform and a merchant that ships the item, the second fund settlement including transferring funds from the payment platform to the merchant, wherein the merchant is applied a punitive measure based on a predetermined rule if an accumulative number of occasions indicating unsuccessful pick-up of goods received from the logistics company is greater than a predetermined threshold.

16. The system of claim 15, wherein the determining that the item is shipped comprising determining that the logistics company picks up the items.

17. The system of claim 15, wherein the determining that the user receives the item comprising determining that the logistics company delivers the item to the user and receives from the user a payment associated with the item.

* * * * *